United States Patent
Parameswaran et al.

(10) Patent No.: US 10,102,308 B1
(45) Date of Patent: Oct. 16, 2018

(54) METHOD AND APPARATUS FOR IDENTIFYING RELATED RECORDS

(71) Applicant: Groupon, Inc., Chicago, IL (US)

(72) Inventors: Suryanarayanan Parameswaran, Chennai (IN); Vivek Singh Solanki, Khalghat (IN); Shubham Mittal, Kota (IN)

(73) Assignee: GROUPON, INC., Chicago, IL (US)

(*) Notice: Subject to any disclaimer, the term of this patent is extended or adjusted under 35 U.S.C. 154(b) by 431 days.

(21) Appl. No.: 14/755,585

(22) Filed: Jun. 30, 2015

(51) Int. Cl.
  *G06F 17/30* (2006.01)
  *G06Q 30/02* (2012.01)

(52) U.S. Cl.
  CPC ..... *G06F 17/3097* (2013.01); *G06Q 30/0223* (2013.01)

(58) Field of Classification Search
  None
  See application file for complete search history.

(56) References Cited

U.S. PATENT DOCUMENTS

| | | | |
|---|---|---|---|
| 2002/0099622 A1* | 7/2002 | Langhammer | G06Q 30/02 705/26.44 |
| 2008/0228544 A1* | 9/2008 | Woosley | G06Q 10/1095 705/7.19 |
| 2012/0311428 A1* | 12/2012 | Goedegebuure | G06F 17/30887 715/234 |
| 2017/0228354 A1* | 8/2017 | Goedegebuure | G06F 17/2288 |

* cited by examiner

*Primary Examiner* — Wilson Lee
(74) *Attorney, Agent, or Firm* — Alston & Bird LLP

(57) ABSTRACT

The present disclosure relates to methods, systems, and apparatuses for identifying related records in a database. The method includes receiving, via a network interface, a related records query, the related records query identifying at least one record stored in the electronic database, determining, based on transaction data, at least one related record that is related to the identified at least one record, determining, by a processor, that the at least one related record is unavailable, in response to determining that the at least one related record is unavailable, determining at least one keyword associated with the at least one related record, selecting at least one of one or more substitute records based at least in part on comparing the at least one keyword with a set of keywords associated with one or more substitute records, and providing the selected one or more substitute records as a response to the related records query.

15 Claims, 5 Drawing Sheets

US 10,102,308 B1

METHOD AND APPARATUS FOR IDENTIFYING RELATED RECORDS

TECHNOLOGICAL FIELD

Example embodiments of the present invention relate generally to identifying related records in databases and, more particularly, to methods, systems, and apparatuses for identifying available related records and selecting related records from a database.

BACKGROUND

The applicant has discovered problems with current methods, systems, and apparatuses for identifying related records. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product to identify records that are related to one another. Example embodiments may include methods, apparatuses, and computer program products. An example of a method for determining related records in an electronic database, includes receiving, via a network interface, a related records query, the related records query identifying at least one record stored in the electronic database, determining, based on transaction data, at least one related record that is related to the identified at least one record, determining, by a processor, that the at least one related record is unavailable, in response to determining that the at least one related record is unavailable, determining at least one keyword associated with the at least one related record, selecting at least one of one or more substitute records based at least in part on comparing the at least one keyword with a set of keywords associated with one or more substitute records, and providing the selected at least one of the one or more substitute records as a response to the related records query.

The transaction data may be used to generate one or more metrics for pairings of records, and wherein the one or more metrics are used to determine the at least one related record that is related to the identified at least one record. The one or more metrics may include at least one of a confidence metric, a value metric, or a lift metric. Determining that the at least one related record is unavailable may include comprises determining that the at least one related record is out of stock. The method may also include determining that the at least one of the one or more substitute records meets at least one recommendation engine constraint, and providing the selected at least one of the one or more substitute records only in response to determining that the at least one of the one or more substitute records meets the at least one recommendation engine constraint. The at least one recommendation engine constraint may include a rule requiring the at least one substitute records to be associated with a value that is less than a different value associated with the at least one record. Each of the at least one record, the at least one related record, and the one or more substitute records may be associated with different products.

Embodiments also include an apparatus. The apparatus includes an electronic database comprising a plurality of records, and record analysis circuitry configured to receive, via a network interface, a related records query, the related records query identifying at least one record stored in the electronic database, receive, via the network interface, transaction data from transaction management circuitry, determine, based on the transaction data, at least one related record that is related to the identified at least one record, determine that the at least one related record is unavailable, in response to determining that the at least one related record is unavailable, determine at least one keyword associated with the at least one related record, select at least one of one or more substitute records based at least in part on comparing the at least one keyword with a set of keywords associated with one or more substitute records, and provide the selected at least one of the one or more substitute records as a response to the related records query.

The record analysis circuitry may be further configured to generate one or more metrics for pairings of records using the transaction data, and determine the at least one related record that is related to the identified at least one record using the one or more metrics. The one or more metrics may include at least one of a confidence metric, a value metric, or a lift metric. Determining that the at least one related record is unavailable may include determining that the at least one related record is out of stock. The record analysis circuitry may be further configured to determine that the at least one of the one or more substitute records meets at least one recommendation engine constraint, and provide the selected at least one of the one or more substitute records only in response to determining that the at least one of the one or more substitute records meets the at least one recommendation engine constraint. The at least one recommendation engine constraint may include a rule requiring the at least one substitute records to be associated with a value that is less than a different value associated with the at least one record. Each of the at least one record, the at least one related record, and the one or more substitute records may be associated with different products.

Embodiments also include a non-transitory computer readable storage medium comprising program instructions configured to, when executed by an apparatus, cause the apparatus to receive, via a network interface, a related records query, the related records query identifying at least one record stored in an electronic database comprising a plurality of records, receive, via the network interface, transaction data from transaction management circuitry, determine, based on the transaction data, at least one related record that is related to the identified at least one record, determine that the at least one related record is unavailable, in response to determining that the at least one related record is unavailable, determine at least one keyword associated with the at least one related record, select at least one of one or more substitute records based at least in part on comparing the at least one keyword with a set of keywords associated with one or more substitute records, and provide the selected at least one of the one or more substitute records as a response to the related records query.

The program instructions may further cause the apparatus to generate one or more metrics for pairings of records using the transaction data, and determine the at least one related record that is related to the identified at least one record using the one or more metrics. The one or more metrics may include at least one of a confidence metric, a value metric, or a lift metric. Determining that the at least one related record is unavailable may include determining that the at least one related record is out of stock. The program instructions may further cause the apparatus to determine that the at least one of the one or more substitute records meets at least one recommendation engine constraint, and provide the selected at least one of the one or more substitute records only in response to determining that the at least one of the one or more substitute records meets the at least one recommendation engine constraint. The at least one recommendation engine constraint may include a rule requiring the at least one substitute records to be associated with a value that is less than a different value associated with the at least one record.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
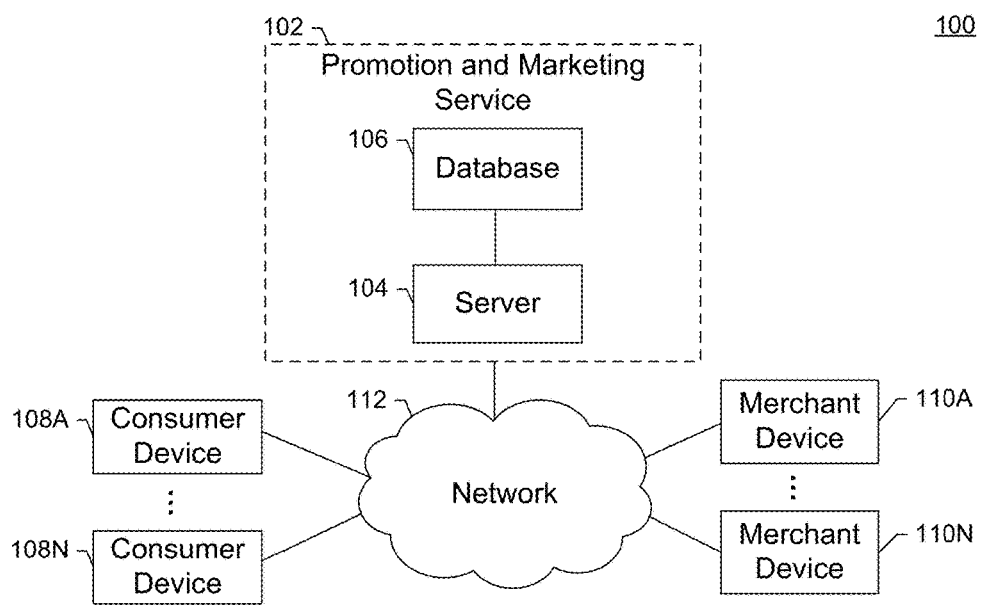
Figure 2:
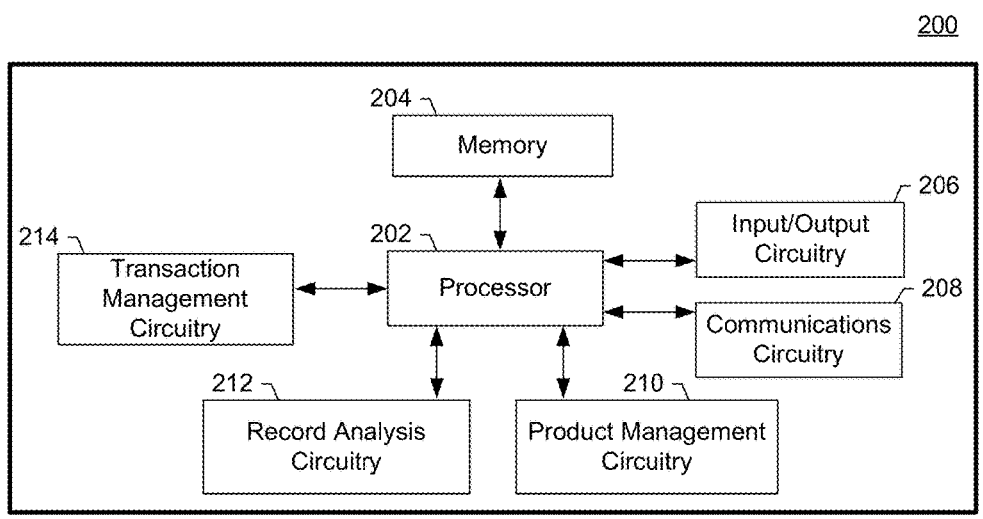
Figure 3:
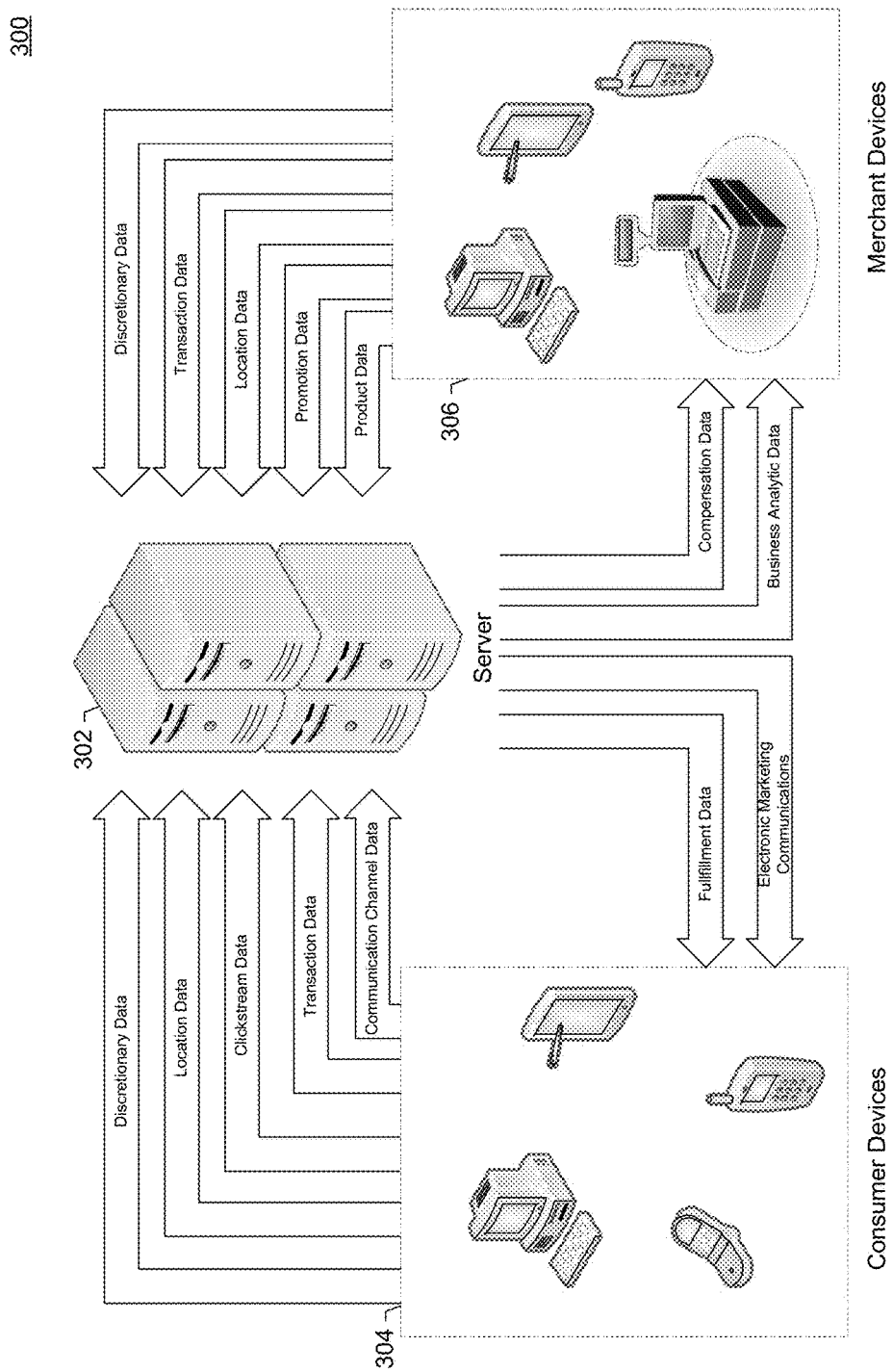
Figure 4:
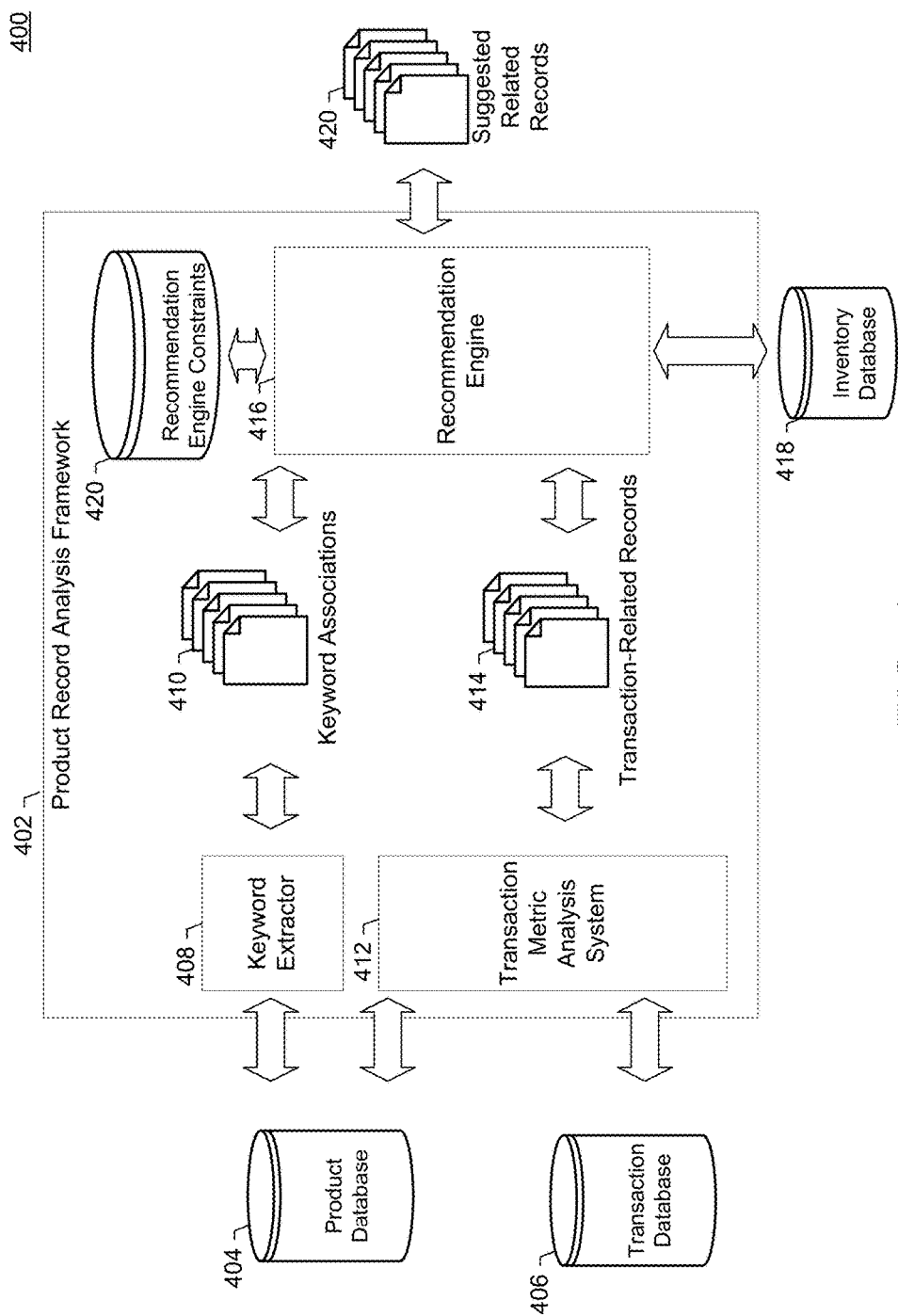
Figure 5:
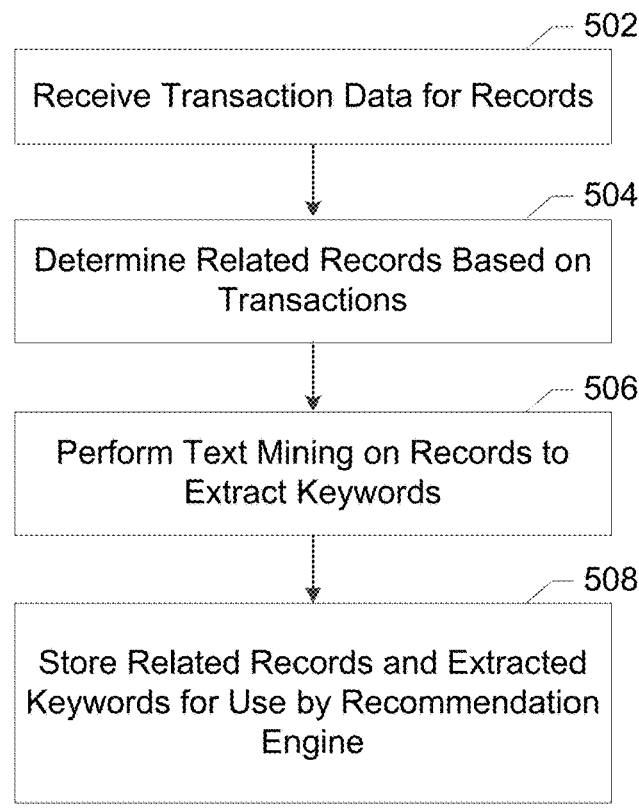
Figure 6:
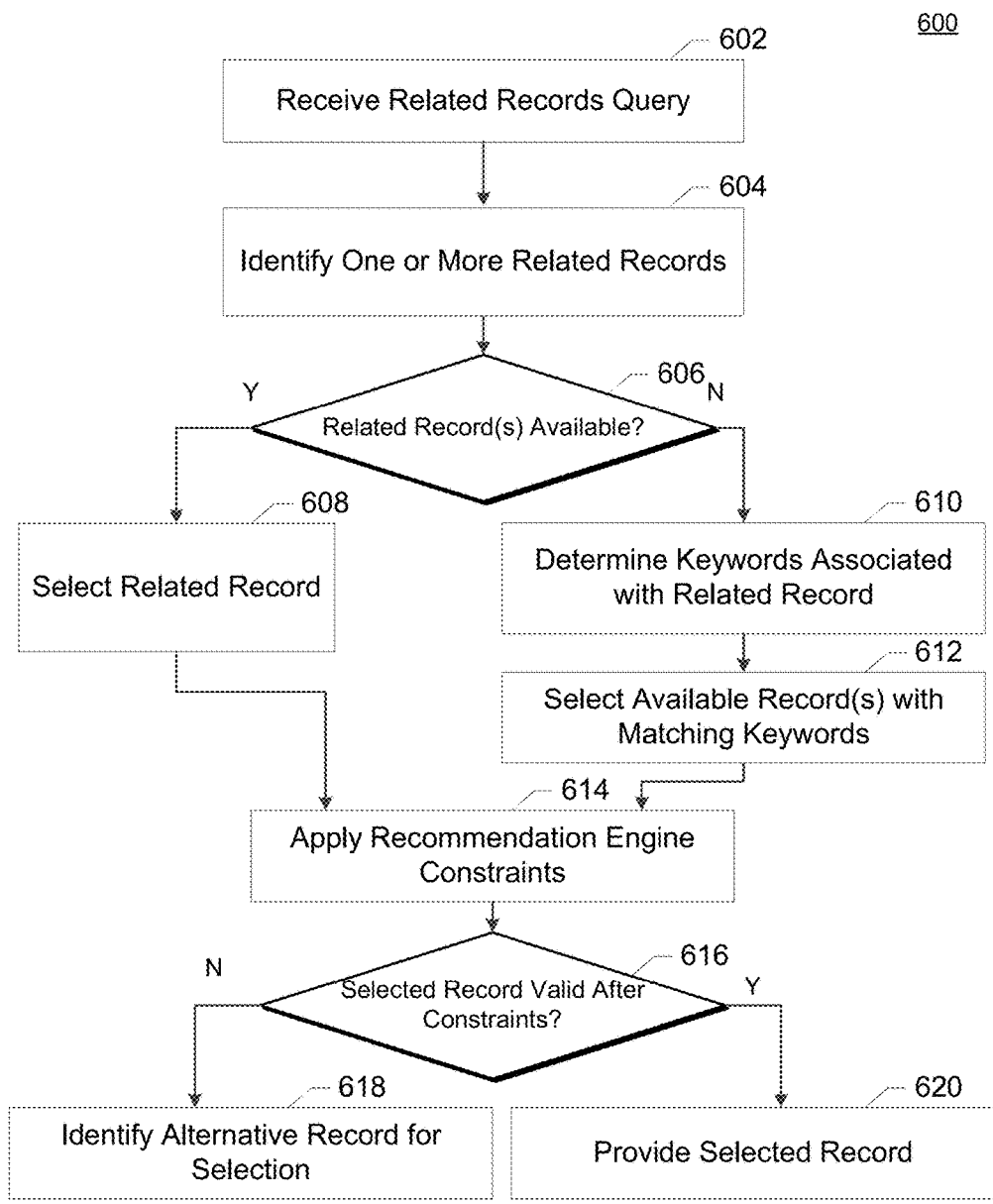

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a promotion recommendation engine using special-purpose circuitry in accordance with some example embodiments of the present invention;

FIG. 3 illustrates an example data flow among a consumer device, a server, and a merchant device in accordance with some example embodiments of the present invention;

FIG. 4 illustrates an example data flow interaction between elements of an example device for implementing a product record analysis framework in accordance with some example embodiments of the present invention;

FIG. 5 illustrates a flowchart describing example operations for generating data to be used in a related-record identification process in accordance with some example embodiments of the present invention; and FIG. 6 illustrates a flowchart describing example operations for selecting a related record in accordance with some example embodiments of the present invention.

DETAILED DESCRIPTION

Overview

Various embodiments of the present invention are directed to improved apparatuses, methods, and computer readable media for identifying related records stored in one or more databases. In this regard, embodiments of the present invention provide systems, devices, and frameworks for monitoring transactions to identify records that are frequently associated with a single transaction. Records that meet certain criteria for association with other records may be identified as related records. When future transactions are performed that include a particular record, those related records may be identified for possible addition to the transaction. Embodiments also contemplate a scenario where, for various reasons, a related record may be unavailable. In such scenarios, embodiments may analyze the related record to identify substitute records. These substitute records may be identified among available records. The substitute records may be identified by, for example, textual mining of each record to identify keywords. Keywords for the unavailable related record may be extracted and compared to keywords extracted from the available records. Available records with matching keywords may be identified as substitute records. Embodiments may also impose predefined constraints on substitute records to ensure that the substitute records are proper substitutes for the unavailable record. For example, the constraints may ensure that items identified within the substitute record have attributes that indicate the substitute records are compatible with the record that is the subject of the transaction, or that the record that is the subject of the transaction and the substitute record, in combination, meet certain criteria.

Embodiments of the present invention may be employed, for example, in web applications to identify Internet content that is related to selected Internet content. For example, in the context of a web server hosting an electronic commerce application, embodiments may identify products or services that are related to a selected product or service to suggest additional products to be "bundled" together for sale. As a specific example, if a user of the hosted web content selects a camera, past transactions involving the particular camera may be associated with a particular camera case, memory card, lens attachment, tripod, or the like. Embodiments may suggest one or more of these related records for purchase by the user as a group. However, if one or more of the related products is out of stock or otherwise unavailable (e.g., unable to be shipped to the user's location), embodiments may use text mining of the related records (e.g., product descriptions, summaries, and the like) to identify keywords. These keywords may be used to identify substitute products with similar keywords. Embodiments may further perform an analysis on identified substitute products using a set of constraints to ensure that the identified substitute products are suitable for suggestion for purchase with the camera. For example, if another camera is identified as a substitute product based on text mining, it would likely be inappropriate to suggest purchase of a second camera with a first camera, and so such a substitute product would be discarded. Such constraints may include, for instance, product typing constraints (e.g., whether a record has a flag marked "accessory"), price constraints (e.g., a record is associated with a numeric value indicating a price of greater than or less than a particular threshold), compatibility constraints (e.g., whether a record is marked as compatible with a particular device or manufacturer), or the like.

It should be readily appreciated that the embodiments of the methods, systems, devices, and apparatuses for identifying related records may be configured in various additional and alternative manners to provide promotion recommendations within the context of a promotion and marketing service as described herein.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "related records query" is intended to refer to electronic data received or generated by a system, device, or apparatus that indicates that the system, device, or apparatus should identify a related record. Related record inquiries may include various forms of electronic data, including but not limited to API requests. In particular, related record queries may be generated in response to a user viewing content associated with a particular record (e.g., a web page for a particular product). Upon viewing of that content, the associated web page may send a related records query to assist with displaying of information about related records for insertion into the web content associated with the particular record. The related records query includes electronic identification data sufficient to identify the particular record that is the subject of the related records query, though it should be appreciated that the related records query may also include additional forms of data such as an identity of the user viewing the content, metadata describing attributes of the particular record, the type of service requesting the related record (e.g., web page, mobile push notification, or email), or the like.

As used herein, the term "product" refers to goods, services, and/or promotions as sold by a promotion and marketing service or other e-commerce system. Products may be tangible (e.g. goods, physical gift cards, physical certificates) or intangible (e.g., electronic codes, account credits).

As used herein, the term "record" refers to a particular entry in a database. A record includes multiple attributes which provide data regarding a particular entity. In the present context, the described entity may be a product offered by a promotion and marketing service. Identification of related records in the context of a promotion and marketing service may, therefore, result in identification of related products.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products are most relevant to the consumer's interest, and to provide marketing materials related to said products to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner.

Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

One particular problem inherent in promotion marketing systems relates to the identification of related records to content being viewed by a consumer. The inventors have recognized that it is desirable to display related content to consumers to allow consumers to select and view said related content. For example, when a consumer views a web page associated with a first product, it may be desirable to modify the web page to include links to other products that are related to the first product. Presentation of content in this manner provides the consumer with the opportunity to select, purchase, or otherwise interact with the related content.

Some systems have been developed for identification of related content. For example, some systems may allow an administrator to manually "hard code" related products into hosted web content. Such hard coded systems are inflexible and may result in recommendations of out of stock or discontinued products. Other systems may provide programmatic determination based on past consumer purchases (e.g., "frequently bought with this item" programmatic content selection). However, these programmatic systems may result in inappropriate recommendations (e.g., where multiple consumers randomly happen to purchase unrelated goods together) or list out-of-stock products. Such programmatic solutions are particularly unsuitable for systems that offer high product turnovers and limited quantities of products and services, such as promotion and marketing services.

To address these problems and other problems arising out of the use of programmatic and automated content association systems, the inventors have developed embodiments that offer improved detection of related records. Embodiments further provide the ability to detect unavailable records and to identify suitable replacement records for unavailable records. Embodiments may employ text mining, keyword matching, and other techniques to identify these replacement records. As a result, embodiments provide for improved systems for identifying related records in databases and content hosting systems.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to identify related records as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, product management circuitry 210, record analysis circuitry 212, and transaction management circuitry 214. The apparatus 200 may be configured to execute the operations described above with respect to FIG. 1 and below with respect to FIGS. 4-6. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The product management circuitry 210 includes hardware configured to generate, provide, and manage product records for products offered by a promotion and marketing service. The product management circuitry 210 may be configured to receive a request from a merchant to generate a new record for a promotion or product and, in response to the request, create a record in a database to facilitate the offering of the new promotion or product via the promotion and marketing service. In some embodiments, the product management circuitry 210 may be further configured to programmatically and/or automatically provide, offer, or generate records for promotions or products in response to the occurrence of a criterion or criteria. For example, a merchant may define a particular set of criteria that cause the product management circuitry 210 to offer a particular promotion or promotions. The product management circuitry 210 may manage records for products stored in a memory, such as the memory 204, and store the records in the memory in response to the record being newly generated. In some embodiments, the product management circuitry 210 may dynamically control the offering parameters for a promotion or promotions in response to the occurrence of the set of criteria. The product management circuitry 210 may utilize processing circuitry, such as the processor 202, to perform these actions. The product management circuitry 210 may receive a request and/or otherwise communicate with a merchant device via a network interface provided by the communications circuitry 208. However, it should also be appreciated that, in some embodiments, the product management circuitry 210 may include a separate processor, specially configured field programmable gate array (FPGA), or application specific interface circuit (ASIC) to manage the offering of promotions via a promotion and marketing service. The product management circuitry 210 is therefore implemented using hardware components of the apparatus configured by either hardware or software for implementing these planned functions.

The record analysis circuitry 212 includes hardware configured to manage, store, process, and analyze records and to identify records that are related to one another. The record analysis circuitry 212 may be configured to receive transaction data and identify records that are related to one another based on one or more metrics derived from the transaction data. The record analysis circuitry 212 may also be configured to determine whether and when a particular record is unavailable, and to substitute an alternative record in such a scenario. A substitute record may be identified, for example, by keyword mining one or more records and using the mined keywords to identify records with one or more keywords in common. The record analysis circuitry 212 may also be configured to apply a set of constraints to a recommendation process to eliminate certain related records from consideration as substitute records.

The record analysis circuitry 212 may, for example, receive a related records query from an external service, such as the transaction management circuitry 214 or another component of the apparatus 200 or a promotion and marketing service 102, and provide a related record or set of related records in response to the related records query. The record analysis circuitry 212 may include a processor, or utilize the processor 202, to perform the analysis functions enumerated above and to provide a response to the related records query. The record analysis circuitry 212 may further store data in a memory, such as the memory 204, indicating which records are related to one another, which keywords are associated with which records, and/or which records may function as substitute records. The record analysis circuitry 212 may further interface with a storage device, such as the memory 204, to obtain information about available products, product inventory levels, and the like. The response to the related records query may be provided via a communications interface, such as provided by the communications circuitry 208. An example data flow within and throughout an example promotion recommendation framework such as may be provided by or in conjunction with the record analysis circuitry 212 is described further below with respect to FIG. 4. Example embodiments of operations that may employ the record analysis circuitry 212 to identify related records are described further below with respect to FIGS. 4-7.

The transaction management circuitry 214 includes hardware configured to track and perform transactions related to one or more records accessible to the apparatus 200. For example, the transaction management circuitry 214 may include hardware and software configured to provide an e-commerce interface and to allow consumers to generate transactions with the promotion and marketing service (e.g., purchases of products). The transaction management circuitry 214 may include hardware and software configured to store transaction records that indicate which products are associated with a given transaction. These transaction records may be accessible to or provided to the record analysis circuitry 212 for use in identifying related records in, for example, a product database containing records associated with particular products. The transaction management circuitry 214 may include hardware and software configured to generate one or more electronic interfaces (e.g., web pages) including editing or altering the content of served web pages in response to information (e.g., related records) received from other components of the apparatus 200, such as the record analysis circuitry 212. The transaction management circuitry 214 may receive transaction data from users to initiate transactions for products offered by the promotion and marketing service via a network interface, such as offered by the communications circuitry 208. The transaction management circuitry 214 includes processing circuitry configured to assist with generation of content and interfaces for use in performing transactions. For example, the transaction management circuitry 214 may generate web interfaces, receive and verify billing information, verify product inventory levels, and cause products to be shipped to purchasers by one or more applications executing on a processor.

For example, the transaction management circuitry 214 may make requests to the record analysis circuitry 212 to request one or more related records, such as during a content generation operation. The content generation operation may include generating a web page for a particular product and including one or more products that are related to the particular product.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

In particular, embodiments of the present invention may leverage knowledge of the server 302 of previous transactions performed by consumers to identify products that are frequently sold together with one another. Records associated with these products may be identified as related to one another by the server, and content associated with particular records may include information about related records.

In the context of the present disclosure, a "transaction" may be understood to represent an interaction between a particular consumer and the promotion and marketing service with respect to a particular promotion offered by the promotion and marketing service. Embodiments may be generally described herein where the transaction is a product purchase transaction, where a consumer receives or is provided with a product in exchange for something of value. However, it should also be understood that the techniques described herein could also be applied to alternative forms of transactions, such as impressions by the consumer of web pages associated with particular products, views of products provided to consumers via an application associated with the promotion and marketing service, and any other interaction which may indicate a relationship between two or more products. These transactions may be analyzed to generate a set of correlation metrics related to the products. In some embodiments, the server 302 may maintain a set of related product records, where the related product records are determined to be related based on correlation metrics derived from electronic marketing information, such as transaction data.

The server 302 may also be configured to monitor inventory levels and/or other availability characteristics (e.g., shipping availability, whether the product is still offered by the manufacturer, whether a new model of the product has been released, or the like) for use in selecting related records. For example, if two records are related to one another, but one of the two records is associated with an availability characteristic that indicates the associated record is unavailable, the server 302 may employ various techniques to identify a substitute record for the unavailable record. Various techniques for identifying substitute records may be employed, including text mining, as described further below with respect to FIGS. 4-6.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by improving the quality of electronic marketing communications transmitted from the server 302 to the consumer devices 304 by providing for improved identification of related product records. In this manner, embodiments offer improvements to the methods by which particular products are selected for recommendation and which products are identified as related products for use in "bundles" or product suggestions. In particular, embodiments provide improved techniques for evaluating various electronic data associated with consumers and previous transactions, along with sophisticated evaluation and filtering techniques for ensuring proper related records are identified, that substitute records are identified if a related record is unavailable, and applying constraints on the related record identification process to ensure that related product recommendations are suitable. These improvements serve to reduce the number of electronic marketing communications that must be sent by the server 302 in order to produce sales, conserving system resources. Furthermore, by providing more accurate recommendations, the consumer may gain the same benefit with less system interaction, thus conserving system resources and improving the technical functionality of both the consumer devices 304 and the server 302.

Example Interactions Among a Product Record Analysis Framework Various Components of a Promotion and Marketing Service FIG. 4 illustrates an example data flow interaction 400 between a product record analysis framework 402 and components of a promotion and marketing service in accordance with some example embodiments of the present invention. The product record analysis framework 402 may function to identify related records based on transaction data, identify suitable replacement records for unavailable records, and apply constraints to a related record identification process. The result of these processes is a system that is operable to identify related records in response to a related records query received from an external source (e.g., a service generating a web page, email, or other electronic marketing communication). The product record analysis framework 402 may be employed, for example, by record analysis circuitry 212, as described above, to facilitate the operations of the record analysis circuitry 212.

The product record analysis framework 402 may employ a keyword extractor 408 and a transaction metric analysis system 412 for providing input to a recommendation engine 416. The keyword extractor 408 may access a product database 404. The product database 404 includes records identifying one or more products and attributes associated with those products. For example, each record of the product database may include a unique product identifier (e.g., a stock keeping unit (SKU)), a text description of the product, a title of the product, a name of the manufacturer of the product, one or more uniform resource locators (URLs) associated with the product, or the like. The keyword extractor 408 may identify a set of keywords from the text fields associated with each record, and store the identified keywords as a set of keyword associations 410 that include a list of each product and its associated keywords. It should be appreciated that the keyword associations 410 could be stored in a variety of formats or data structures, and, in some embodiments, may be generated dynamically in response to receipt of a related records query.

Keywords for each record may be identified according to a variety of textual analysis mechanisms. For example, each record may be analyzed to identify a particular number of relevant keywords (e.g., 3 words, 5 words, 10 words, or the like) that are determined by pruning irrelevant words from descriptions (e.g., generic terms common to most/all product records), stemming remaining words, noting the frequency of particular words, calculating an inverse-document frequency, identifying synonyms, and otherwise applying linguistic and textual analysis techniques to identify relevant keywords for each record. Keywords may be identified, for example, by using a formula that takes into account the number of times a particular word appears in text associated with the record (e.g., a product description, title, product category, or the like), the number of total words in the text associated with the record, the total number of records, the total number of records, the number of records with the particular word, or the like. For example, the following formulas may be used:

$$TFIDF(t) = TF(t) * IDF(t) \quad \text{(Eq 1)}$$

$$TF(t) = (\text{Number of times word } t \text{ appears in text})/\text{Total Number of Words in Text} \quad \text{(Eq 2)}$$

$$IDF(t) = \log\_e(\text{Total Number of Records}/\text{Number of Records containing } t) \quad \text{(Eq 3)}$$

Where t is a particular word within text associated with a record, TFIDF is a value that is used to score the word, such that higher scoring words are more likely to be selected as keywords for that record (e.g., where the top n scoring words are selected as the keywords for the record), and TF(t) and IDF(t) are metrics relating to the prominence of the word t within the text and the relative uniqueness of the word t with respect to all records, respectively.

The transaction metric analysis system 412 may interact with the product database 404 and a transaction database 406 to generate one or more transaction metrics that identify products that are frequently related to one another in transactions. For example, the transaction metric analysis system 412 may receive data from the transaction database 406 that includes prices and identifiers for products purchased in each transaction performed by the promotion and marketing service. These product identifiers may be used to associate the transaction with particular product records from the product database 404.

Various metrics and analysis techniques may be employed by the transaction metric analysis system 412 to identify relationships among particular product records. For example, the transaction metric analysis system 412 may employ rankings and thresholds based on a confidence value, a support value, and a lift value for relationships among particular product records.

In the context of the present application, the term "support value" is understood to indicate the fraction of transactions within the transaction database 406 that include a particular product or set of products. For example, the support for a given product may be determined by dividing the number of transactions including that product by the total number of transactions performed by the promotion and marketing service. In some embodiments, the support may be determined for a particular time period (e.g., over a given week, day, month, or the like) such that new product records are not unduly penalized.

The term "confidence value" is understood to indicate the likelihood that a given relationship among two records (e.g., a pairing of two products) is indicative that a purchase of a first product associated with one of the two records is also associated with a purchase of the second product associated with the other of the two records. For example, the confidence value may be determined by a formula:

$$\text{Confidence}(\text{Product 1} \rightarrow \text{Product 2}) = \text{support}(T_{1+2})/(\text{support}(T_1)) \quad \text{(Eq 4)}$$

Where Confidence (Product 1→Product 2) indicates the confidence that a purchase of Product 1 also causes a purchase of Product 2, $T_{1+2}$ is the number of transactions including both Product 1 and Product 2, and $T_1$ is the number of transactions with Product 1. The result is a calculation of the probability that a given transaction that includes the first product also includes the second product.

The term "lift value" is understood to refer to a probability that a purchase of one of the two products causes a purchase of the other of the two products. This value may be calculated by dividing the fraction of transactions in the database that include both products by the probability that the purchase of the individual products co-occur if the products are independent. In this manner, the "lift value" accounts for the possibility that two products are randomly purchased together, and also enables identification of certain item combinations that might not otherwise be identifiable through the use of a confidence value alone.

Record pairs or other groupings that have confidence and lift scores in excess of particular threshold values may be identified as related records. For example, embodiments may rank record pairings that have appeared in at least one transaction based on their associated confidence and lift values. The transaction metric analysis system 412 may generate a set of transaction-related records 414 which include data identifying related records. For example, the transaction metric analysis system 412 may generate a table, database, or the like of each record pairing identified from data mining the transaction database 406 and their attendant metrics. Alternatively, only a top number of related records may be identified to conserve memory and reduce the processing overhead required to generate related record data. The transaction-related records 414 may include a list of product identifiers (e.g., SKUs) for records that are related to other records in the product database. For example, the related records may identify products that may be "bundled" with one another for marketing purposes.

A recommendation engine 416 may utilize the keyword associations 410 and the transaction-related records 414, along with a set of recommendation engine constraints 420 and an inventory database 418 to notify external systems of related records. The recommendation engine 416 may receive a related records query from an external application, service, or system. For example, a web server generating a web page document to provide to a consumer device may request information on products related to a particular product (e.g., a product associated with the URL of the web page). The recommendation engine 416 may employ various recommendation algorithms to provide these recommendations (see, e.g., the algorithms illustrated below with respect to FIGS. 5 and 6).

Upon receiving a related records query, the recommendation engine 416 may access the set of transaction-related records 414 to determine which records, if any, are related to a record identified in the related records query. If no related records are identified, the recommendation engine 416 may return a default record or an error result in response to the related records query. If the record identified in the related records query has at least one related record, the recommendation engine 416 may access the inventory database 418 to determine if the identified related record is available. As noted above, the inventory database 418 may include availability information for one or more of the records identified in the product database 404. For example, the inventory database 418 may indicate a remaining quantity of each product, shipping or billing constraints for each product, or other information pertaining to whether or not each product is available for purchase by a consumer.

If the related record is available, the related record may be selected for evaluation by a set of recommendation engine constraints 420. If the related record is unavailable, the recommendation engine 416 may access the keyword associations 410 to identify the keywords associated with the related records. The keywords associated with the related records may be matched to keywords for other records, and a substitute record may be selected based on the keyword match to the related record. This substitute record may then be evaluated according to the recommendation engine constraints 420.

The recommendation engine constraints 420 may include a set of rules for evaluating the selected record to ensure the selected record is suitable to be provided in response to the related record query. For example, records for a DVD player and a television may be identified as related to one another based on the fact that they are frequently purchased together. However, common sense reasoning would indicate that while a consumer who is purchasing a television might be interested in also purchasing a DVD player, a consumer who is purchasing a DVD player is likely to be less interested in purchasing a television, since the consumer who has set out to purchase the DVD player likely already owns a television. Accordingly, the recommendation engine constraints may define a set of rules for providing related records recommendations. For example, the constraints may include a pricing rule, such that any record provided in response to the query must be associated with a lower price than the record identified in the related records query. In some embodiments, a threshold price difference is set, to ensure that the selected related record is at least a certain amount less expensive than the record associated with the related records query. Other rules may include a classification rule, such that the related record must be from a different classification than the record identified in the related records query. Yet further rules may take into account metrics such as page views, gross revenue, requested refunds, and the like for the related record to ensure that the selected record has certain minimum performance characteristics. In some embodiments, records with particular attributes (e.g., mobile phone accessories) may also include sub-attributes which are used for classification (e.g., matching the manufacturer of the mobile phone accessory to the manufacturer of a purchased mobile phone).

If the selected related record satisfies the recommendation engine constraints, then the selected related record may be provided to the system, service, or application that initiated the related records query as one or more suggested related records 420. If the selected related record fails to satisfy the recommendation engine constraints, then an alternative related record may be selected.

In some embodiments, the constraints are not applied to related records that are identified through a direct transactional association (i.e., the transaction-related records 414), as these related records may be considered to be more likely to be correct owing to the fact that they are based on actual transaction data. In such cases that recommendation engine constraints 420 may be applied only to records identified as substitutes for transaction-related records 414.

It should thus be appreciated that in some embodiments, the transaction-related metrics 414 and/or keyword associations 410 may be generated in an "offline" manner, where the transaction-related metrics 414 and/or keyword associations 410 are generated prior to receiving a related records query. In such embodiments, the transaction-related metrics 414 and/or keyword associations 410 may be generated at periodic intervals (e.g., once per day, once per week, or the like), or based on particular events. For example, transaction-related metrics 414 and/or keyword associations 410 may be generated or updated every time a certain number of transactions are performed by a promotion and marketing service, every time a new product is added to the promotion and marketing service, every time sufficient system resources exist to review or revise the transaction-related metrics 414 and/or keyword associations 410 without impacting other functionality of a promotion and marketing service, every time the recommendation engine constraints 420 are updated, or according to any other scenario. In other embodiments, the transaction-related metrics 414 and/or keyword associations 410 may be generated dynamically in response to the receipt of a related records query.

Example Processes for Selecting Related Records

FIG. 5 illustrates an example of a process 500 for generating metrics in accordance with embodiments of the present invention. The process 500 may be performed by components of a product record analysis framework as described above with respect to FIG. 4. The process 500 may gather transaction data and use the transaction data to determine a set of metrics for product records that are present in the same transaction(s). These metrics may be employed to identify records that are related to one another. To perform the process 500, transaction data may be received from a variety of sources. For example, transactions performed by a promotion and marketing service may be sent to the recommendation engine as the transactions occur. Alternatively, transaction data may be stored in a database that is accessible to the recommendation engine. It should also be appreciated that, while the instant process is described as performed in isolation and in an "offline" manner with respect to a related record identification operation, other embodiments may perform on-demand determination of related records by determining transaction metrics and keyword data mining in response to receiving a related records query. Embodiments of the process 500 may function as algorithms for data gathering, metric calculation, and identification of related records as employed by record analysis circuitry as described above with respect to FIG. 2 and as a component of a product record analysis framework as described with respect to FIG. 4.

At action 502, transaction data is received. As noted above, the transaction data may be received as electronic data from various sources, including a transaction database, from transaction management circuitry, or the like. At action 504, related records are identified using the transaction data. Identification of the related records may involve calculating metrics for pairings of records located in the set of transactions. For example, each pairing of records that appears in the same transaction may have support values, a confidence value, and a lift value calculated for the pairing. Each separate record may have a list of values identifying the corresponding confidence, support, and lift for each other record that appears in the same transaction as the separate record. Records may be identified as related records in response to the associated metrics having a certain threshold value. For example, a pairing of records may require a minimum confidence value of 10% to be considered as related records. Metric threshold values may be set dynamically based on certain factors, such as the number of possible related records, the number of records identified in transactions, or the like. For example, the minimum thresholds for being identified as related may be decreased if more record recommendations are desired (e.g., a lower threshold if 3 related records are desired than if only 1 related record is desired). In some embodiments, the different metrics are assigned particular weights and added together, such that record with the highest sum of each metric is identified as a related record for a selected record.

In some embodiments, multiple records may be identified as related records for a particular record. For example, three different products may be identified as related to one particular product. Each of these three products may be stored and/or identified as related to the particular product. In some embodiments, each of these products may be used in a related record recommendation operation prior to identification of a substitute record (see FIG. 6, described further below).

At action 506, text mining is performed on each record to identify keywords associated with that metric. As noted above, the text mining may include a variety of text and linguistic analysis techniques and processes including, but not limited to pruning irrelevant words from descriptions (e.g., generic terms common to most/all product records), stemming remaining words, noting the frequency of particular words, identification of synonyms, and otherwise applying linguistic and textual analysis techniques to identify relevant keywords for each record.

At action 508, the data indicating the related records (e.g., lists of related records or metrics derived from the transaction data) is stored along with the extracted keywords. The related records and extracted keywords may be employed by, for example, a recommendation engine to selected related records for a record identified in a related records query.

FIG. 6 illustrates an example of a process 600 for selecting a related record to be provided in response to a related records query in accordance with embodiments of the present invention. The process 600 may receive a related records query that identifies a record and uses metrics and/or extracted keywords to identify one or more records that are related to the record identified in the related records query. The process 600 also advantageously provides for the use of substitute related records based on one or more related records being unavailable. Embodiments of the process 600 may function as algorithms for selecting related records as employed by record analysis circuitry as described above with respect to FIG. 2 and as a component of a product record analysis framework as described with respect to FIG. 4.

At action 602, a related records query is received. As noted above, the related records query identifies as least one record stored in a database, such as a product. For example, the related records query may be generated in response to a consumer viewing a particular set of web content associated with a particular product. At the time the consumer requests the web content, the related records query may be sent to a product record analysis framework by a service or system that provides the web content.

At action 604, one or more related records for the record identified in the related records query may be determined. The related records may be identified by accessing a set of transaction-related records. As noted above, the transaction-related records may indicate a set of metrics derived from transactions that include references to or more products. Determination of the related records may include selecting a record that is indicated as having a highest value for one or more of the metrics within the transaction-related records.

At action 606, a determination is made as to whether the record determined at action 604 is available. To determine if the record is available, the process 600 may access data included in an inventory database. The data may indicate a quantity remaining, shipping availability, manufacture availability, or other data values that may be used to determine whether the related record is available. In some embodiments, the information from the inventory database may be cross-referenced with other information, such as a consumer identifier associated with the related records request, a location, or other value that may provide additional context to determining whether the related record is available.

If the related record is available, then the process proceeds to action 608. If the related record is available, the process proceeds to action 610. At action 608, if the related record is available, the related record is selected. At action 610, if the related record is unavailable, the keywords associated with the (unavailable) related record are identified. These keywords are used to perform a matching with keywords of other, available records to determine available records with the same or similar keywords to those of the originally selected related record. In some embodiments, matching between the keywords for the unavailable related record and the other, available records is performed using a cosine similarity algorithm or other matching algorithm as known in the art. In some embodiments, keywords for the record identified in the related records request are also employed, such that a matching is performed between the keywords of the record identified in the related records request, the related record identified at action 604, and the other, available records. At action 612, one of the available records with the closest keyword match as determined at action 610 is selected.

At action 614, a set of recommendation engine constraints are applied to the selected record. As noted above, these constraints may include, for example, restrictions on price related to the record identified in the related records request (e.g., making sure the selected record is at least a threshold price value less expensive than the record in the related records query), restrictions that ensure the selected record is associated with a different type of product than the product in the related records request, or any other constraint as described above. For example, if the product identified in the related records request is a camera, embodiments may ensure that no other cameras are recommended, despite the possibility of similar keyword matches for records associated with other cameras. If the product identified in the related records request is a tablet computer by a particular manufacturer, embodiments may ensure that any records selected as related records are compatible with that tablet computer (e.g., the correct type of memory card, cases fit the tablet form factor, or the like).

At action 616, if the selected record is not valid after application of the constraints, the process proceeds to action 618 where an alternative record is selected, such as by repeating the process 600 while excluding the previously selected record that failed to meet the constraints. If the selected record is valid after application of the constraints, the process proceeds to action 620 where the selected record is provided in response to the related records query. Upon providing the selected record to the original initiator of the related records query, the record may be used to generate web content (e.g., Hypertext Markup Language code or other machine-readable code) associated with the selected record, such as by embedding web content associated with the related record in a web page generated by the initiator of the related records query.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for determining related records in an electronic database, the apparatus comprising at least a processor, and a memory associated with the processor having computer coded instructions therein, with the computer instructions configured to, when executed by the processor, cause the apparatus to:

receive, via a network interface, a related records query from an external device, the related records query identifying at least one record stored in the electronic database;

receive, via the network interface, transaction data from transaction management circuitry;

determine, based on the transaction data, at least one related record that is related to the identified at least one record;

determine that the at least one related record is unavailable;

in response to determining that the at least one related record is unavailable, determine keyword metadata associated with the at least one related record;

select a first substitute record of a plurality of substitute records based at least in part on comparing the keyword metadata with a set of keywords associated with one or more substitute records;

apply a set of recommendation engine constraints to the first substitute record; and in a circumstance where the first substitute record satisfies the set of recommendation engine constraints, provide the first substitute record to the external device.

2. The apparatus of claim 1, wherein the computer instructions are further configured to, when executed by the processor, cause the apparatus to:

generate one or more metrics for pairings of records using the transaction data; and determine the at least one related record that is related to the identified at least one record using the one or more metrics.

3. The apparatus of claim 2, wherein the one or more metrics comprise at least one of a confidence metric, a value metric, or a lift metric.

4. The apparatus of claim 1, wherein determining that the at least one related record is unavailable comprises determining that the at least one related record is out of stock.

5. The apparatus of claim 1, wherein the computer instructions are further configured to, when executed by the processor, cause the apparatus to:

in a circumstance where the first substitute record does not satisfy the set of recommendation engine constraints, select a second substitute record.

6. The apparatus of claim 1, wherein the set of recommendation engine constraints comprise a rule requiring the first substitute record to be associated with a value that is less than a different value associated with the at least one record.

7. The apparatus of claim 1, wherein each of the at least one record, the at least one related record, and the first substitute record is associated with different products.

8. A non-transitory computer readable storage medium comprising program instructions configured to, when executed by an apparatus, cause the apparatus to:

receive, via a network interface, a related records query from an external device, the related records query identifying at least one record stored in an electronic database comprising a plurality of records;

receive, via the network interface, transaction data from transaction management circuitry;

determine, based on the transaction data, at least one related record that is related to the identified at least one record;

determine that the at least one related record is unavailable;

in response to determining that the at least one related record is unavailable, determine keyword metadata associated with the at least one related record;

select a first substitute record of a plurality of substitute records based at least in part on comparing the keyword metadata with a set of keywords associated with one or more substitute records;

apply a set of recommendation engine constraints to the first substitute record; and in a circumstance where the first substitute record satisfies the set of recommendation engine constraints, provide the first substitute record to the external device.

9. The computer readable storage medium of claim 8, wherein the program instructions further cause the apparatus to:

generate one or more metrics for pairings of records using the transaction data; and determine the at least one related record that is related to the identified at least one record using the one or more metrics.

10. The computer readable storage medium of claim 9, wherein the one or more metrics comprise at least one of a confidence metric, a value metric, or a lift metric.

11. The computer readable storage medium of claim 8, wherein determining that the at least one related record is unavailable comprises determining that the at least one related record is out of stock.

12. The computer readable storage medium of claim 8, wherein the program instructions further cause the apparatus to:

in a circumstance where the first substitute record does not satisfy the set of recommendation engine constraints, select a second substitute record.

13. The computer readable storage medium of claim 8, wherein the set of recommendation engine constraints comprise a rule requiring the first substitute record to be associated with a value that is less than a different value associated with the at least one record.

14. The apparatus of claim 1, wherein the computer instructions are further configured to, when executed by the processor, cause the apparatus to:

in a circumstance where the first substitute record does not satisfy the set of recommendation engine constraints, select a second substitute record of the plurality of substitute records based at least in part on comparing the keyword metadata with the set of keywords associated with one or more substitute records, apply the set of recommendation engine constraints to the second substitute record; and in a circumstance where the second substitute record satisfies the set of recommendation engine constraints, provide the second substitute record to the external device.

15. The computer readable storage medium of claim 8, wherein the program instructions further cause the apparatus to:

in a circumstance where the first substitute record does not satisfy the set of recommendation engine constraints, select a second substitute record of the plurality of substitute records based at least in part on comparing the keyword metadata with the set of keywords associated with one or more substitute records, apply the set of recommendation engine constraints to the second substitute record; and in a circumstance where the second substitute record satisfies the set of recommendation engine constraints, provide the second substitute record to the external device.

\* \* \* \* \*